(12) United States Patent
Acedo Sánchez et al.

(10) Patent No.: US 8,541,898 B2
(45) Date of Patent: Sep. 24, 2013

(54) CONTROL METHOD AND SYSTEM FOR A WIND POWER INSTALLATION IN CASE OF GRID FAULTS

(75) Inventors: Jorge Acedo Sánchez, Sarriguren (ES); Ainhoa Cárcar Mayor, Sarriguren (ES); Josu Elorriaga Llanos, Sarriguren (ES); Jesús Mayor Lusarreta, Sarriguren (ES); Susana Simón Segura, Sarriguren (ES); David Solé López, Sarriguren (ES); Mikel Zabaleta Maeztu, Sarriguren (ES); Jesús López Taberna, Sarriguren (ES); Luis Marroyo Palomo, Sarriguren (ES)

(73) Assignee: Ingeteam Power Technology, S.A., Zamudio (ES)

( * ) Notice: Subject to any disclaimer, the term of this patent is extended or adjusted under 35 U.S.C. 154(b) by 430 days.

(21) Appl. No.: 12/994,226

(22) PCT Filed: May 22, 2009

(86) PCT No.: PCT/ES2009/070177
§ 371 (c)(1), (2), (4) Date: Jan. 19, 2011

(87) PCT Pub. No.: WO2009/141485
PCT Pub. Date: Nov. 26, 2009

(65) Prior Publication Data
US 2011/0140432 A1    Jun. 16, 2011

(30) Foreign Application Priority Data

May 23, 2008 (ES) .................................. 200801525

(51) Int. Cl.
*F03D 9/00* (2006.01)
*H02P 9/04* (2006.01)
*H02J 1/00* (2006.01)
*H02J 3/00* (2006.01)

(52) U.S. Cl.
USPC ................................. 290/44; 290/55; 307/77

(58) Field of Classification Search
USPC ....................................... 290/44, 55; 307/77
See application file for complete search history.

(56) References Cited

U.S. PATENT DOCUMENTS

| 4,812,729 | A | 3/1989 | Ito et al. ....................... 318/732 |
| 7,372,174 | B2 * | 5/2008 | Jones et al. ..................... 290/44 |

(Continued)

FOREIGN PATENT DOCUMENTS

| WO | 03/028203 | 4/2003 |
| WO | 03/058789 | 7/2003 |
| WO | 2005/015730 | 2/2005 |

OTHER PUBLICATIONS

International Search Report issued Mar. 18, 2010 in International (PCT) Application No. PCT/ES2009/070177.

*Primary Examiner* — Pedro J Cuevas
(74) *Attorney, Agent, or Firm* — Sughrue Mion, PLLC

(57) ABSTRACT

The present invention relates to a method and system for controlling a wind power installation connected to an electrical power grid, in case of a fault in said grid.
In the electrical machines that form part of the wind power installation, generators and transformers, it is possible to change the impedance of the neutral closure introducing a plurality of active and passive elements. This limits the currents during the grid fault, thereby reducing the peak torque in the mechanical train of the wind turbines and allows guaranteeing compliance with the network connection requirements, as control of the active and reactive currents is maintained at all times.

24 Claims, 4 Drawing Sheets

(56) References Cited

U.S. PATENT DOCUMENTS

| | | | | |
|---|---|---|---|---|
| 7,425,771 | B2 * | 9/2008 | Rivas et al. | 290/44 |
| 7,476,987 | B2 * | 1/2009 | Chang | 290/55 |
| 7,511,385 | B2 * | 3/2009 | Jones et al. | 290/43 |
| 7,554,303 | B1 * | 6/2009 | Kawamura | 322/46 |
| 7,579,702 | B2 * | 8/2009 | Park et al. | 290/44 |
| 7,656,052 | B2 * | 2/2010 | Jones et al. | 290/43 |
| 7,692,321 | B2 * | 4/2010 | Jones et al. | 290/43 |
| 8,183,704 | B2 * | 5/2012 | Rivas et al. | 290/44 |
| 8,207,623 | B2 * | 6/2012 | Rivas et al. | 290/44 |
| 8,212,408 | B2 * | 7/2012 | Fishman | 307/77 |
| 8,264,094 | B2 * | 9/2012 | Rivas et al. | 290/44 |
| 8,294,288 | B2 * | 10/2012 | Rivas et al. | 290/44 |
| 8,344,532 | B2 * | 1/2013 | Letas | 290/44 |
| 2007/0030606 | A1 | 2/2007 | Ganev et al. | 361/23 |
| 2007/0246943 | A1 * | 10/2007 | Chang et al. | 290/44 |
| 2008/0150285 | A1 * | 6/2008 | Corcelles Pereira et al. | 290/44 |
| 2009/0167095 | A1 * | 7/2009 | Rivas et al. | 307/87 |
| 2009/0278351 | A1 * | 11/2009 | Rivas et al. | 290/44 |
| 2009/0278352 | A1 * | 11/2009 | Rivas et al. | 290/44 |
| 2010/0148506 | A1 * | 6/2010 | Letas | 290/44 |
| 2010/0156189 | A1 * | 6/2010 | Fishman | 307/77 |
| 2011/0018270 | A1 * | 1/2011 | Corcelles Pereira et al. | 290/44 |
| 2011/0057443 | A1 * | 3/2011 | Rivas et al. | 290/44 |
| 2013/0020804 | A1 * | 1/2013 | Roesmann et al. | 290/44 |
| 2013/0027003 | A1 * | 1/2013 | Zheng et al. | 322/99 |
| 2013/0038061 | A1 * | 2/2013 | Rivas et al. | 290/44 |

* cited by examiner

US 8,541,898 B2

CONTROL METHOD AND SYSTEM FOR A WIND POWER INSTALLATION IN CASE OF GRID FAULTS

This application is a 371 of PCT/ES2009/070177 filed on May 22, 2009.

OBJECT OF THE INVENTION

The present invention relates to a method and system for controlling a wind power installation connected to an electrical power grid, when a fault occurs in this grid.

BACKGROUND OF THE INVENTION

In recent years the number of wind power turbines and wind farms connected to the electrical power grid has increased considerably. For this reason, grid operators have increased the performance requirements for wind turbines, specifying certain requirements of behaviour in case of faults (e.g. grid voltage dips) to prevent their cut-off from the grid.

Among the various wind turbine types, those based on double-fed topologies are most sensitive to grid perturbations. In this type of topology, in case of a voltage dip the rotor winding suffers high currents that may damage the converter connected to the rotor.

There are currently several different solutions that protect the converter from the high currents produced in double-fed systems.

Some of these solutions (such as WO03/065567, WO 2004/091085 and WO 2005/015730), for example, introduce impedances in parallel to the stator or the rotor of the generator. However, these solutions require uncoupling the generator from the grid or losing control of the generator in the initial moments of the transition, thereby hindering compliance with grid operator requirements.

Other solutions (WO03/058789) propose inserting between the generator and the grid some impedances in series with each of the stator phases. This requires incorporating a high number of components in the system, with the resulting increase in losses and risk of faults.

The invention disclosed presents an alternative that allows, in case of grid fault, to keep the generator connected to the grid and controlled at all times with a small number of elements that provide improved performance and reliability of the system. This invention intends to limit the currents present during the grid fault, so that the peak torque in the mechanical train is reduced and at the same time guaranteeing compliance with grid connection requirements, as the active and reactive currents are controlled at all times.

DESCRIPTION OF THE INVENTION

The current in the asynchronous generator in the event of a voltage dip of considerable magnitude may be reduced by increasing the impedance of any of the paths followed by the current or any of its reflections.

In electric machines involved in energy conversion, for example a generator and a transformer, it is possible to modify the impedance of the neutral closing by introducing a plurality of active and passive elements.

Active elements refers to switches such as thyristors, IGBTs, relays, contactors etc. Passive elements refers to any combination of impedances (resistances, inductances and capacitors).

The control system of the invention relates to a wind power installation in case of grid faults that is characterised by having at least one rectifier element and one set of active and passive elements that are connected to close a neutral. This neutral can be that of the generator rotor, the generator stator or that of at least one transformer of the wind power installation.

Therefore, the invention has an element that can vary temporarily the impedance of the closure of the neutral of one of the system elements using a rectifying element and a set of passive and active elements. Specifically, it could act on the connection of the generator rotor, the generator stator or on one of the windings (primary or secondary) of any of the transformers of the wind power installation, such as the transformers of the wind turbines, the substation or any other transformer present in the internal grid of the wind power installation.

The control method of the invention relates to a wind power installation and includes the following phases: detecting the grid perturbations; generating control signals for the active elements that modify the impedance of the closure of the selected neutral, selecting this neutral from among that of the generator rotor, the generator stator and the neutral of at least one transformer of the wind power station; detecting the end of the grid perturbations and generating control signals for the active elements to return to the impedance value of the neutral prior to modification.

To aid a better understanding of this description and as an integral part of it, a set of drawings are accompanied where the object of the invention has been represented for purposes of illustration and in a non-limiting sense.

DESCRIPTION OF ONE OR SEVERAL EXAMPLES OF EMBODIMENT OF THE INVENTION

A description is now made of examples of the invention with reference to the figures. First the system of the invention will be described, followed by the method of operation, which is common to all embodiments.

In the preferred embodiment an asynchronous generator with a winding rotor is used. However, the invention is applicable to wind turbines with any other type of asynchronous generator.

Figure 1:
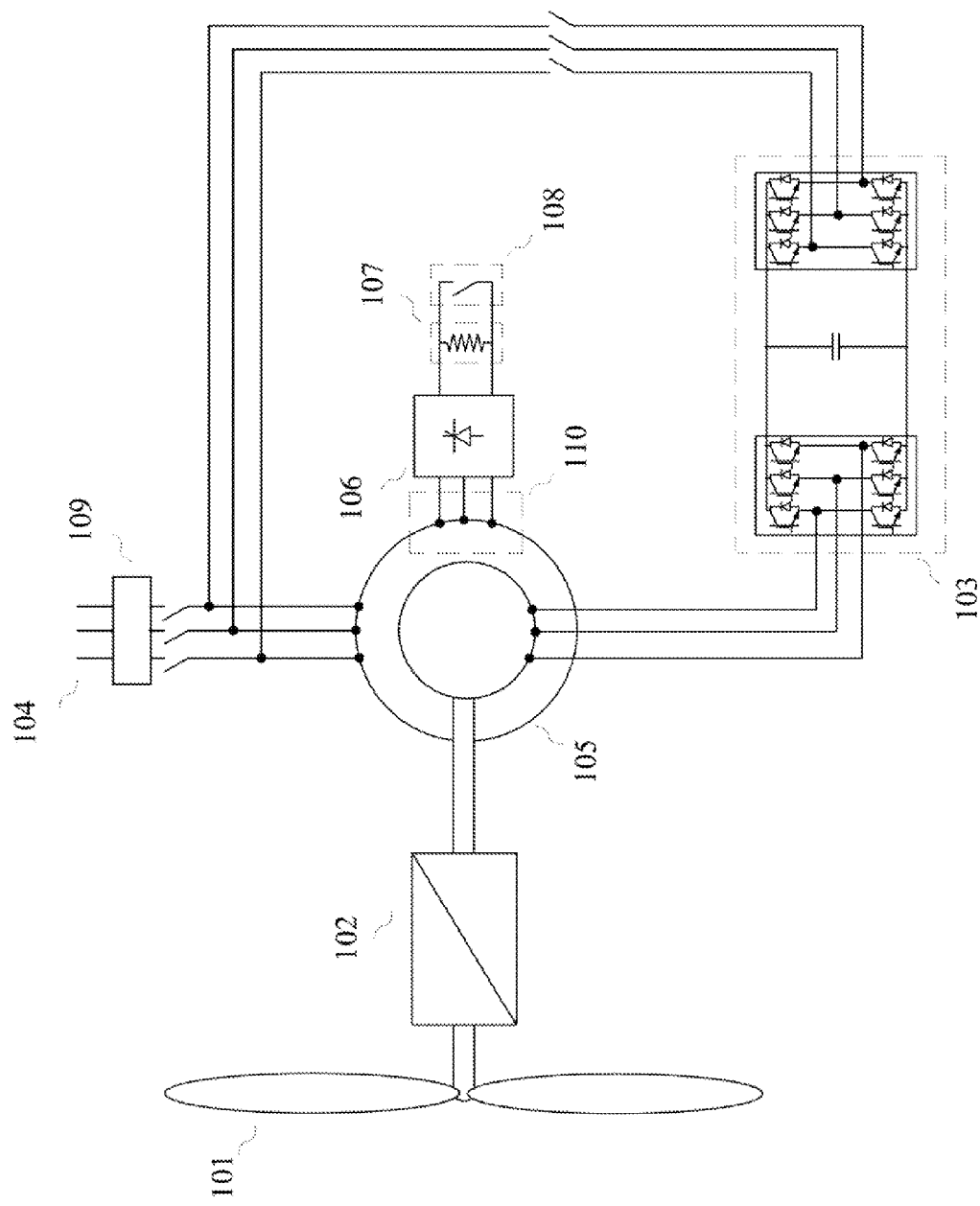
FIG. 1.—Shows a general schematic representation of the operation according to a preferred embodiment in which the closing of the neutral of the stator of a winding rotor asynchronous generator is acted upon.

In a preferred embodiment of the invention (FIG. 1) the neutral closing of a winding-rotor asynchronous stator generator (105) is acted on. This figure shows a generator (105) with the start and end terminals of each stator winding accessible. A rectifier bridge (106) is connected to the end terminals of each of the aforementioned stator windings (110). At the dc output of the rectifier bridge (106) is connected an impedance (107) in parallel to an active switch (108) (such as a thyristor, IGBT or the like).

Figure 2:
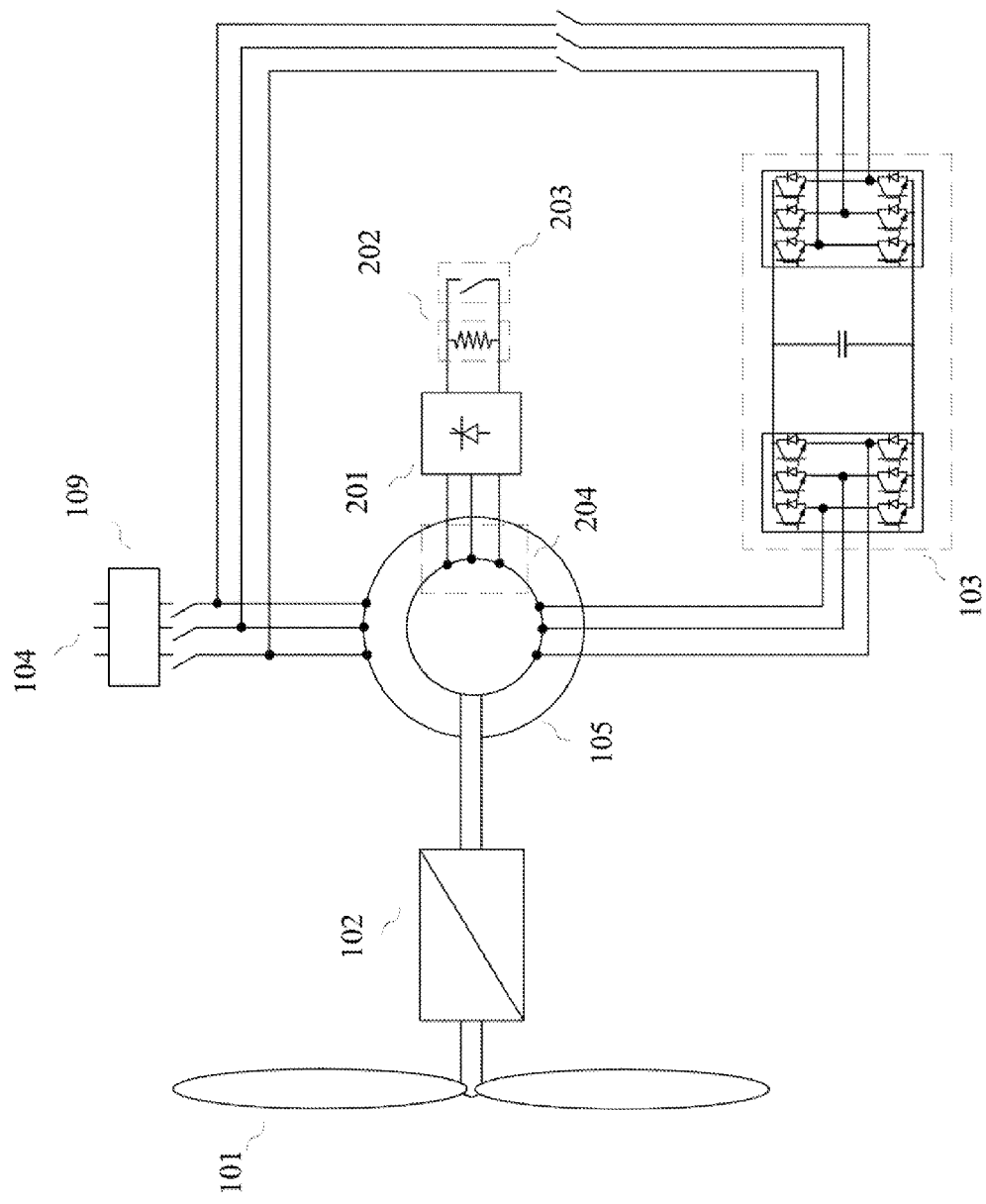
FIG. 2.—Shows a general schematic representation of the operation according to a preferred embodiment in which the closing of the neutral of the rotor of a winding rotor asynchronous generator is acted upon.

In another preferred embodiment (FIG. 2) the rectifier bridge (201) with the impedance (202) and the active switch (203) can act on the closing of the neutral of the windings (204) of the generator (105).

Figure 3:
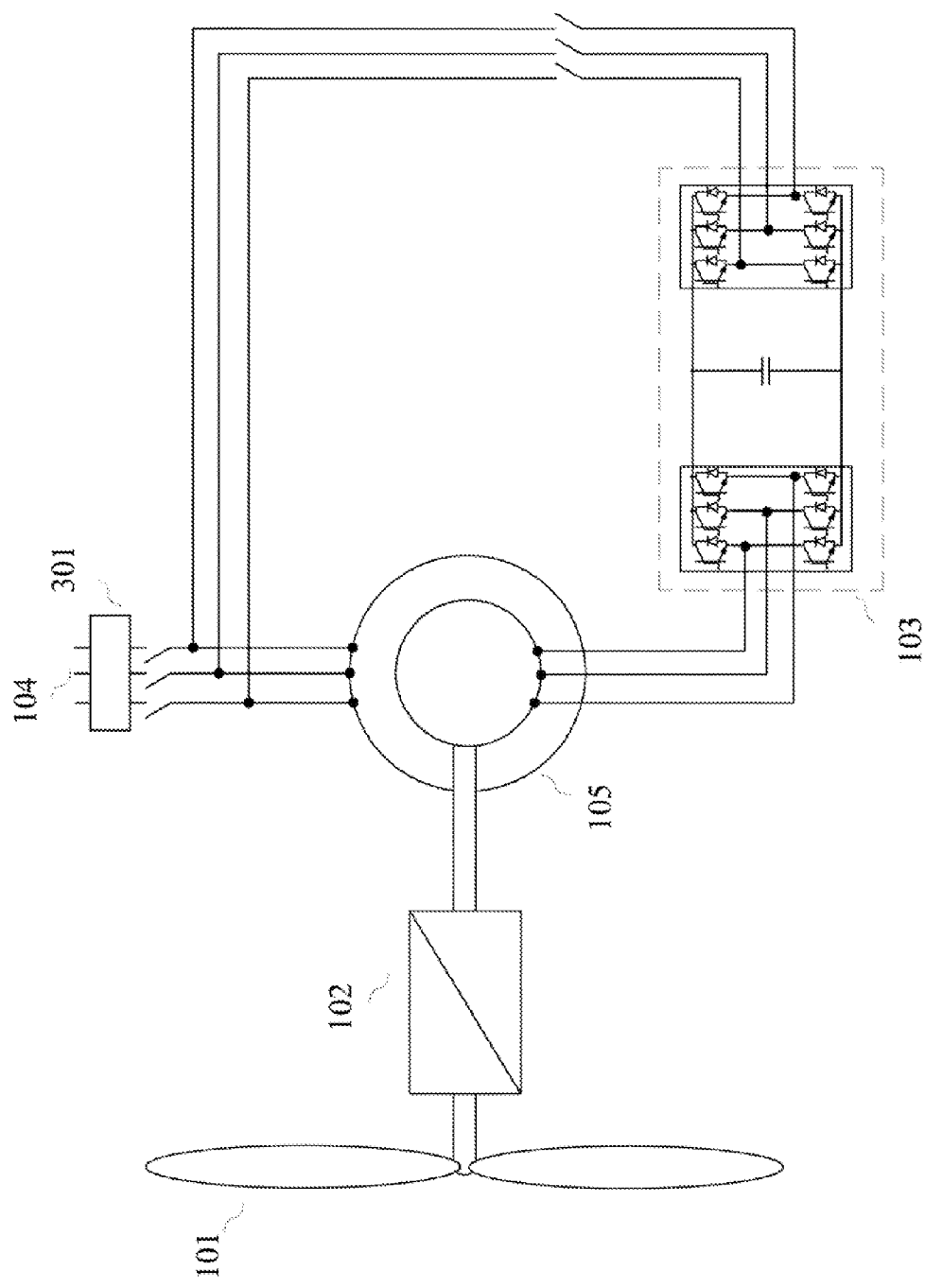
FIG. 3.—Shows a general schematic representation of the operation according to a preferred embodiment in which the closing of the neutral of the transformer of a winding rotor asynchronous generator is acted upon.
Figure 4:
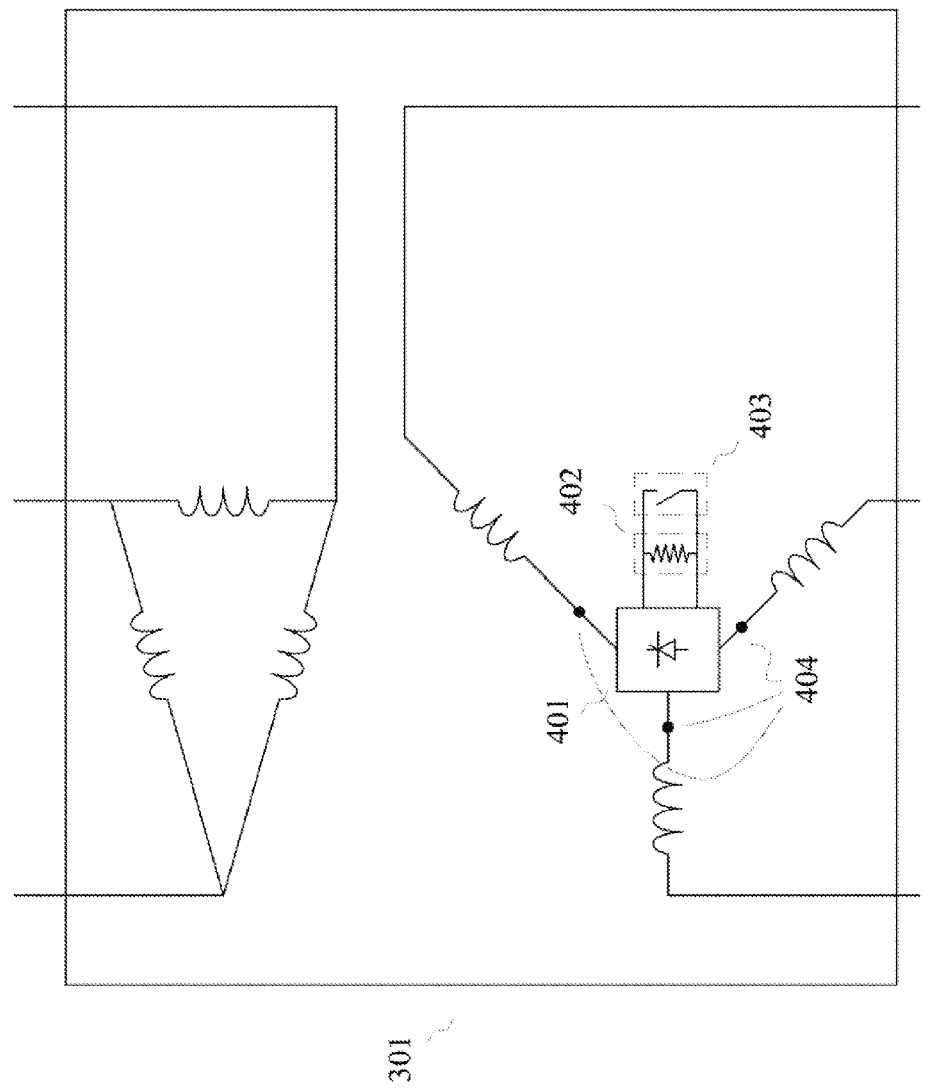
FIG. 4.—Shows a detailed representation of the transformer block (301) of the previous figure (FIG. 3).

In addition, in another preferred embodiment (FIG. 3-FIG. 4) the rectifier bridge (401) with the impedance (402) and the active switch (403) can be connected to any of the windings 404 (primary or secondary) of any of the transformers (301) of the wind power installation.

In normal operation, in each preferred embodiment the impedance of the neutral closure is reduced by short-circuiting the impedances (107, 202, 402) by activating the active switch (108, 203, 403) in order to minimise losses. The situation is then the same as if the corresponding electric machine was star-connected.

If a voltage dip is detected the control will act by opening the active switch (108, 203, 402), forcing the current arriving from the generator (105) to pass, after it is rectified to direct current, through the impedance (107, 202, 402) in parallel to the active switch (108, 203, 403). This allows reducing the current and maintaining the generator connected to the grid, while keeping the system controlled at all times. In this case the system control parameters may be varied to adjust to the new operation conditions.

When the end of the grid perturbations is detected the active switch (108, 203, 403) will be closed, short-circuiting the impedances (107, 202, 402).

The invention claimed is:

1. A control system for a wind power installation in case of grid faults wherein it increases temporarily the impedance between end terminals of windings of an electrical machine and a neutral point of the electrical machine of the wind power installation by means of at least one rectifier element and one set of active and passive elements, being said one rectifier element and said set of active and passive elements connected in series to said end terminals of the windings, and being said windings of the electrical machine selected from the group consisting of generator rotor windings, generator stator windings and windings of at least one transformer of the wind power installation.

2. The control system of claim 1, wherein the temporarily increment of the impedance is carried out by rectifying a current arriving from the windings of the electrical machine to direct current, opening the active element and forcing the current arriving from the windings of the electrical machine to pass through the passive element in parallel to the active element.

3. The control system of claim 1, applicable in generators with a stator connected to the power grid, wherein the terminals of the generator stator windings are connected to at least one rectifying element; a DC output of the at least one rectifying element is connected to the one set of active and passive elements.

4. The control system of claim 1, applicable in asynchronous type generators with a winding rotor, the stator of which is connected to the power grid, wherein the terminals of the generator rotor windings are connected to at least one rectifying element; a DC output of the at least one rectifying element is connected to the one set of active and passive elements.

5. The control system of claim 1, wherein the terminals of a winding selected between a primary winding and a secondary winding of one of the transformers of the wind power installation are connected to at least one rectifying element; a DC output of the at least one rectifying element is connected to the one set of active and passive elements.

6. The control system of claim 1, wherein said the at least one rectifying element being a rectifier bridge, the passive element being an impedance and the active element being an active switch, which is connected in parallel to the impedance.

7. A control method for a wind power installation in case of grid faults that allows operating the system defined in claim 1, comprising the following stages:
 detecting the grid perturbations;
 generating control signals for the active elements that increase the impedance between end terminals of windings of an electrical machine and a neutral point of the electrical machine of the wind power installation, being said windings selected from the group consisting of generator rotor windings, generator stator windings and windings of at least one transformer of the wind power installation;
 detecting the end of the grid perturbations;
 generating control signals for the active elements to return the impedance between end terminals of windings of an electrical machine and a neutral point of the electrical machine of the wind power installation to the value prior to its variation.

8. The control system of claim 2, applicable in generators with a stator connected to the power grid, wherein the terminals of the generator stator windings are connected to at least one rectifying element; a DC output of the at least one rectifying element is connected to the one set of active and passive elements.

9. The control system of claim 2, applicable in asynchronous type generators with a winding rotor, the stator of which is connected to the power grid, wherein the terminals of the generator rotor windings are connected to at least one rectifying element; a DC output of the at least one rectifying element is connected to the one set of active and passive elements.

10. The control system of claim 2, wherein said the at least one rectifying element being a rectifier bridge, the passive element being an impedance and the active element being an active switch, which is connected in parallel to the impedance.

11. The control system of claim 3, wherein said the at least one rectifying element being a rectifier bridge, the passive element being an impedance and the active element being an active switch, which is connected in parallel to the impedance.

12. The control system of claim 4, wherein said the at least one rectifying element being a rectifier bridge, the passive element being an impedance and the active element being an active switch, which is connected in parallel to the impedance.

13. The control system of claim 5, wherein said the at least one rectifying element being a rectifier bridge, the passive element being an impedance and the active element being an active switch, which is connected in parallel to the impedance.

14. A control method for a wind power installation in case of grid faults that allows operating the system defined in claim 2, comprising the following stages:
 detecting the grid perturbations;
 generating control signals for the active elements that increase the impedance between end terminals of windings of an electrical machine and a neutral point of the electrical machine of the wind power installation, being said windings selected from the group consisting of generator rotor windings, generator stator windings and windings of at least one transformer of the wind power installation;

detecting the end of the grid perturbations;

generating control signals for the active elements to return the impedance between end terminals of windings of an electrical machine and a neutral point of the electrical machine of the wind power installation to the value prior to its variation.

15. A control method for a wind power installation in case of grid faults that allows operating the system defined in claim 3, comprising the following stages:

detecting the grid perturbations;

generating control signals for the active elements that increase the impedance between end terminals of windings of an electrical machine and a neutral point of the electrical machine of the wind power installation, being said windings selected from the group consisting of generator rotor windings, generator stator windings and windings of at least one transformer of the wind power installation;

detecting the end of the grid perturbations;

generating control signals for the active elements to return the impedance between end terminals of windings of an electrical machine and a neutral point of the electrical machine of the wind power installation to the value prior to its variation.

16. A control method for a wind power installation in case of grid faults that allows operating the system defined in claim 4, comprising the following stages:

detecting the grid perturbations;

generating control signals for the active elements that increase the impedance between end terminals of windings of an electrical machine and a neutral point of the electrical machine of the wind power installation, being said windings selected from the group consisting of generator rotor windings, generator stator windings and windings of at least one transformer of the wind power installation;

detecting the end of the grid perturbations;

generating control signals for the active elements to return the impedance between end terminals of windings of an electrical machine and a neutral point of the electrical machine of the wind power installation to the value prior to its variation.

17. A control method for a wind power installation in case of grid faults that allows operating the system defined in claim 5, comprising the following stages:

detecting the grid perturbations;

generating control signals for the active elements that increase the impedance between end terminals of windings of an electrical machine and a neutral point of the electrical machine of the wind power installation, being said windings selected from the group consisting of generator rotor windings, generator stator windings and windings of at least one transformer of the wind power installation;

detecting the end of the grid perturbations;

generating control signals for the active elements to return the impedance between end terminals of windings of an electrical machine and a neutral point of the electrical machine of the wind power installation to the value prior to its variation.

18. A control method for a wind power installation in case of grid faults that allows operating the system defined in claim 6, comprising the following stages:

detecting the grid perturbations;

generating control signals for the active elements that increase the impedance between end terminals of windings of an electrical machine and a neutral point of the electrical machine of the wind power installation, being said windings selected from the group consisting of generator rotor windings, generator stator windings and windings of at least one transformer of the wind power installation;

detecting the end of the grid perturbations;

generating control signals for the active elements to return the impedance between end terminals of windings of an electrical machine and a neutral point of the electrical machine of the wind power installation to the value prior to its variation.

19. A control method for a wind power installation in case of grid faults that allows operating the system defined in claim 8, comprising the following stages:

detecting the grid perturbations;

generating control signals for the active elements that increase the impedance between end terminals of windings of an electrical machine and a neutral point of the electrical machine of the wind power installation, being said windings selected from the group consisting of generator rotor windings, generator stator windings and windings of at least one transformer of the wind power installation;

detecting the end of the grid perturbations;

generating control signals for the active elements to return the impedance between end terminals of windings of an electrical machine and a neutral point of the electrical machine of the wind power installation to the value prior to its variation.

20. A control method for a wind power installation in case of grid faults that allows operating the system defined in claim 9, comprising the following stages:

detecting the grid perturbations;

generating control signals for the active elements that increase the impedance between end terminals of windings of an electrical machine and a neutral point of the electrical machine of the wind power installation, being said windings selected from the group consisting of generator rotor windings, generator stator windings and windings of at least one transformer of the wind power installation;

detecting the end of the grid perturbations;

generating control signals for the active elements to return the impedance between end terminals of windings of an electrical machine and a neutral point of the electrical machine of the wind power installation to the value prior to its variation.

21. A control method for a wind power installation in case of grid faults that allows operating the system defined in claim 10, comprising the following stages:

detecting the grid perturbations;

generating control signals for the active elements that increase the impedance between end terminals of windings of an electrical machine and a neutral point of the electrical machine of the wind power installation, being said windings selected from the group consisting of generator rotor windings, generator stator windings and windings of at least one transformer of the wind power installation;

detecting the end of the grid perturbations;

generating control signals for the active elements to return the impedance between end terminals of windings of an electrical machine and a neutral point of the electrical machine of the wind power installation to the value prior to its variation.

22. A control method for a wind power installation in case of grid faults that allows operating the system defined in claim 11, comprising the following stages:
- detecting the grid perturbations;
- generating control signals for the active elements that increase the impedance between end terminals of windings of an electrical machine and a neutral point of the electrical machine of the wind power installation, being said windings selected from the group consisting of generator rotor windings, generator stator windings and windings of at least one transformer of the wind power installation;
- detecting the end of the grid perturbations;
- generating control signals for the active elements to return the impedance between end terminals of windings of an electrical machine and a neutral point of the electrical machine of the wind power installation to the value prior to its variation.

23. A control method for a wind power installation in case of grid faults that allows operating the system defined in claim 12, comprising the following stages:
- detecting the grid perturbations;
- generating control signals for the active elements that increase the impedance between end terminals of windings of an electrical machine and a neutral point of the electrical machine of the wind power installation, being said windings selected from the group consisting of generator rotor windings, generator stator windings and windings of at least one transformer of the wind power installation;
- detecting the end of the grid perturbations;
- generating control signals for the active elements to return the impedance between end terminals of windings of an electrical machine and a neutral point of the electrical machine of the wind power installation to the value prior to its variation.

24. A control method for a wind power installation in case of grid faults that allows operating the system defined in claim 13, comprising the following stages:
- detecting the grid perturbations;
- generating control signals for the active elements that increase the impedance between end terminals of windings of an electrical machine and a neutral point of the electrical machine of the wind power installation, being said windings selected from the group consisting of generator rotor windings, generator stator windings and windings of at least one transformer of the wind power installation;
- detecting the end of the grid perturbations;
- generating control signals for the active elements to return the impedance between end terminals of windings of an electrical machine and a neutral point of the electrical machine of the wind power installation to the value prior to its variation.

* * * * *